Oct. 30, 1962    A. STICKEL    3,060,708
APPARATUS FOR BENDING GLASS SHEETS
Filed Sept. 20, 1960    4 Sheets-Sheet 1

INVENTOR.
Allwin Stickel
BY
Nobbe & Swope
ATTORNEYS

Oct. 30, 1962　　　A. STICKEL　　　3,060,708
APPARATUS FOR BENDING GLASS SHEETS
Filed Sept. 20, 1960　　　　　4 Sheets-Sheet 2

INVENTOR.
Allwin Stickel
BY
Nobbe & Swope
ATTORNEYS

Oct. 30, 1962   A. STICKEL   3,060,708
APPARATUS FOR BENDING GLASS SHEETS
Filed Sept. 20, 1960   4 Sheets-Sheet 4

INVENTOR.
Allwin Stickel
BY
Nobbe & Swope
ATTORNEYS

United States Patent Office 3,060,708
Patented Oct. 30, 1962

3,060,708
APPARATUS FOR BENDING GLASS SHEETS
Allwin Stickel, Toledo, Ohio, assignor to Libbey-Owens-Ford Glass Company, Toledo, Ohio, a corporation of Ohio
Filed Sept. 20, 1960, Ser. No. 57,871
3 Claims. (Cl. 65—291)

This invention relates generally to the bending or shaping of glass sheets or plates to a desired configuration. More particularly, it relates to a multiple section hinged type bending mold having improved means for locating the sheets relative to the bending mold.

This application is a continuation-in-part of the co-pending application of Allwin Stickel, Serial No. 732,259, now abandoned, filed May 1, 1958.

In bending glass sheets on a so-called movably mounted hinge type or skeleton mold which is movable from an open position and a closed position under the influence of gravity the flat glass sheets are located in a predetermined position above the mold in the open position. The flat glass sheets act as struts which maintain the mold in the open or sheet receiving position because the rigidity of the glass sheets does not permit the mold end sections to move to a closed position. As the bending mold and the flat glass sheets are passed through a bending furnace, the glass is heated to bending temperature and the flat glass sheets lose their rigidity. Thus, these sheets no longer act as struts to maintain the mold in the open position and the mold closes under the influence of gravity.

As the flat glass sheets are placed on the open mold, it is desirable to limit any longitudinal motion between the glass sheets and the mold to ensure proper positioning of the glass sheets relative to the mold shaping surfaces. This is particularly desirable in the case wherein the glass sheets are pattern cut before bending, and the extreme outermost end portions are offset from the longitudinal axis of the mold. Various types of fixed sheet locating members which are rigidly secured to the mold sections have been successfully used with molds of this type to properly locate the sheets relative to the mold shaping surface. These fixed sheet locating members are attached to the outermost portions of the mold end sections and prevent longitudinal movement of the glass sheet along the mold by engaging the edges of the glass sheets.

As the mold moves from the open position to the closed position, the chordal distance between the extreme outermost portions of the mold end sections decreases as the end sections rotate upwardly and inwardly. Inasmuch as the chordal distance between the ends of the mold decreases the distance which the glass sheet must span also decreases but the length of the glass sheet itself does not change. Ordinarily this does not present a problem because as the glass sheet sags into contact with the mold the distance between the ends of the sheet decreases along with the decrease in the mold chordal distance.

However, it has been found desirable to support the glass sheet in close proximity with the mold center section when the mold is in the open position, and in so doing, the glass sheet bends very little before it contacts the mold shaping surface. Therefore, the ends of the sheet must move outward in relationship to the ends of the bending mold during that portion of the bending cycle in which the mold closes, but sagging of the sheet is limited by contact with the central portion of the mold because the distance between the ends of the sheet did not decrease as quickly as did the chordal distance of the mold. Moreover, the direction of movement of the end portions of the glass sheet along the endmost portions of the mold shaping surface reverses after the mold closes and the glass sheet sags into contact with the remaining portions of the mold.

Thus, if fixed members are used to restrain longitudinal movement of the glass sheet relative to the mold, the mold could not close until the sheet had sagged into contact with substantially the entire shaping surface of the mold. Consequently, it is desirable to restrain the glass sheet from longitudinal movement by means of movable members which engage the ends of the sheet when the mold is in the open position and which permit the ends of the glass sheet to move outward in relation to the mold end sections after the center of the glass sheet has sagged into contact with the mold center section. Such a locating device must not interfere with the removal of the bent sheets from the mold, and the possibility of chipping or scratching of the bent sheets by the locating device when the bent sheets are removed from the mold must be minimized. Also the heat retained by the sheet engaging members of the locating device must not cause undesirable stresses to be set up in the bent glass sheets due to uneven cooling around the peripheral edges.

I have found that it is desirable to have the sheet engaging member of the locating device as far removed from the edges of the bent glass sheets as possible when the mold moves to the closed position. I have further found that the greatest danger of the glass sheet shifting relative to the mold occurs in the early stages of the bending cycle as the substantially unbent sheet and the open mold move along a conveyor in a bending furnace, and that after a portion of the glass sheet contacts the mold shaping surface the sheet will be less likely to move in a longitudinal direction relative to the mold.

Accordingly, it is the object of the present invention to provide an improved apparatus for bending glass sheets.

Another object of the invention is to provide an improved locating device for positioning flat glass sheets relative to a bending mold.

Another object of the present invention is to provide an improved bending mold having a sheet locating device which positions the flat glass sheets relative to the mold prior to bending by contacting the flat glass sheets and which moves out of contact with the sheets when they are bent into substantial conformity with the mold shaping surface.

Another object of the invention is to provide a sheet locating device for bending molds which is located in substantial juxtaposition with the unbent glass sheets when the mold is in the sheet receiving position and which is moved out of juxtaposition with the bent glass sheets when the mold is in its closed position.

Other objects and advantages of the invention will become more apparent during the course of the following description when taken in connection with the accompanying drawings.

In the drawings, wherein like numerals are employed to designate like parts throughout the same:

Figure 1:
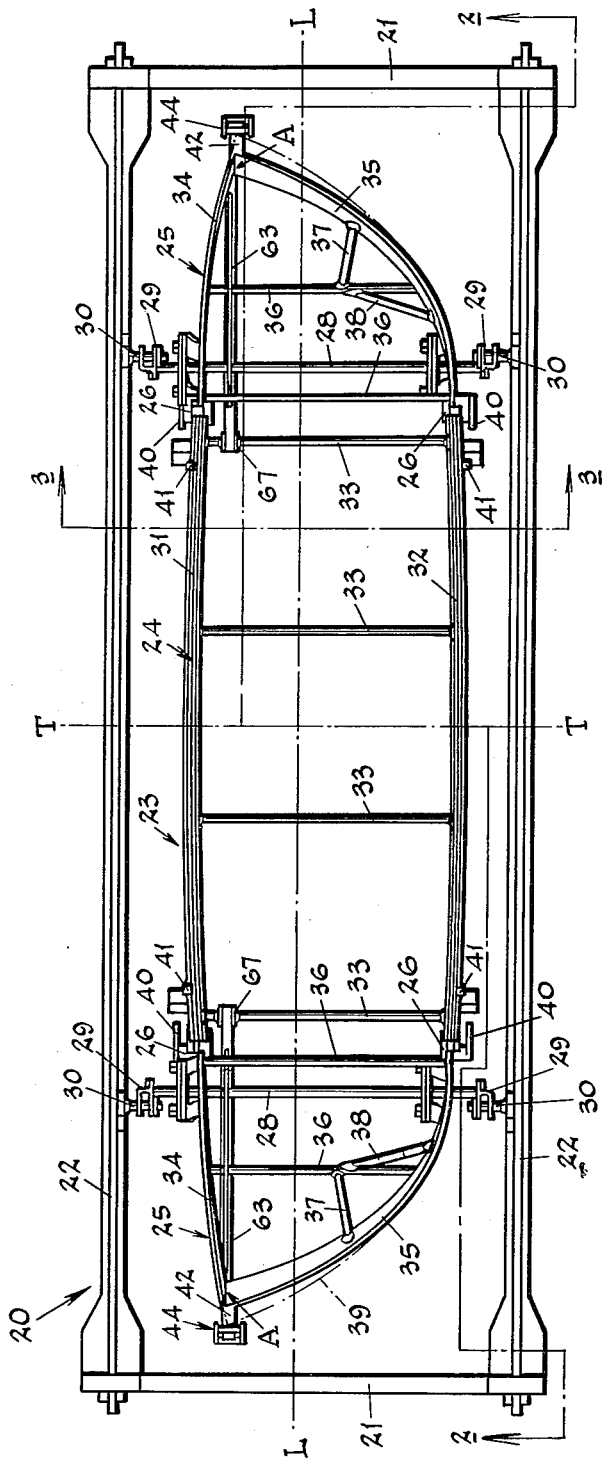
FIG. 1 is a plan view of a hinged type bending mold of the type described and showing the locating means associated with the end sections thereof in accordance with this invention when the mold is in the open position.

With reference now to the drawings and particularly FIGS. 1 to 4 the numeral 20 designates in its entirety a substantially rectangular mold support frame. This frame comprises a pair of spaced upwardly extending end members 21 which are connected to one another at their uppermost ends by a pair of concavely curved U-shaped mold supports 22.

The mold proper is generally indicated by the numeral 23 and comprises a plurality of cooperatively connected mold sections including a center section 24 and a pair of oppositely disposed aligned end sections 25. The center section 24 is movably connected to each of the oppositely disposed end sections 25 by means of hinges 26, and in the closed position of FIG. 2 there is formed a continuous shaping surface of the desired contour for the bent glass sheet. Rotation of the movably mounted end sections to the open position of FIG. 1 and the closed position of FIG. 2 is about transversely extending hinge pins 27 which extend through the hinges 26.

To support the mold for movement from the open position to the closed position, a transversely extending pivot bar 28 is adjustably secured to each of the mold end sections and the oppositely disposed ends of each pivot bar 28 are rotatably supported by links 29 which in turn are pivoted about pins 30 that are fixedly mounted on the mold support 22. The pivot bars 28 are normally adjusted so that the mold will close due to the weight of the center section 24 unless a force is applied to the outermost portions A of the oppositely disposed end sections 25.

The center section 24 of the mold includes a pair of spaced concavely curved forming rails 31 and 32 formed by inverted T sections which rise from the center in an arc that terminates at each hinge 26. The uppermost surface of each inverted T section is machined to the desired curvature to which the glass sheets are bent to produce an upwardly facing shaping surface which engages and supports the glass sheets after they are bent. Tie rods 33 form an integral portion of the center section 24 and span the space between the forming rails 31 and 32 being rigidly secured to the underside of these rails. Thus, the relative positions of the two shaping rails are positively maintained.

Figure 4:
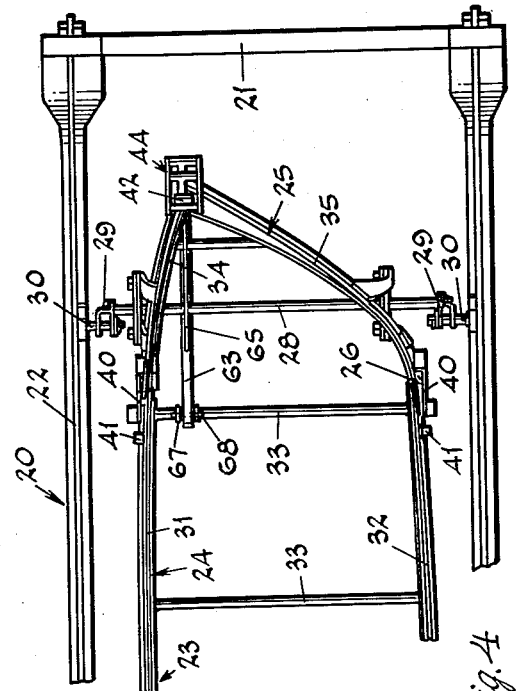
FIG. 4 is a fragmentary plan view of one end of the bending mold of FIG. 1 in the closed position.
Figure 3:
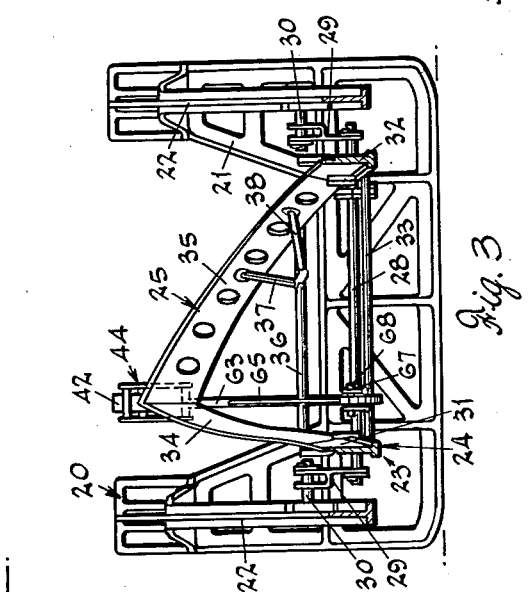
FIG. 3 is a transverse sectional view of the bending mold of FIG. 1 taken substantially along the section line 3—3 of FIG. 1.

Each end section 25 comprises a pair of forming rails 34 and 35 which are joined at the outermost extremities to form a V-shaped configuration as best seen in FIGS. 3 and 4. The forming rails 34 and 35 are formed by inverted T sections and are in substantial alignment with the center section forming rails 31 and 32. The end section forming rails 34 and 35 also have upwardly facing shaping surfaces which engage and support the bent glass sheets and, as stated above, the end mold sections 25, formed by the forming rails 34 and 35, are secured to and carried by the laterally disposed pivot bars 28. Tie rods 36 are secured to the underside of the end section forming rails 34 and 35 to ensure the proper configuration of the mold end sections 25. Diagonal braces 37 and 38 join the end section forming rail 35 and the transverse tie rod 36 to provide additional bracing of the V-shaped end sections 25.

Figure 2:
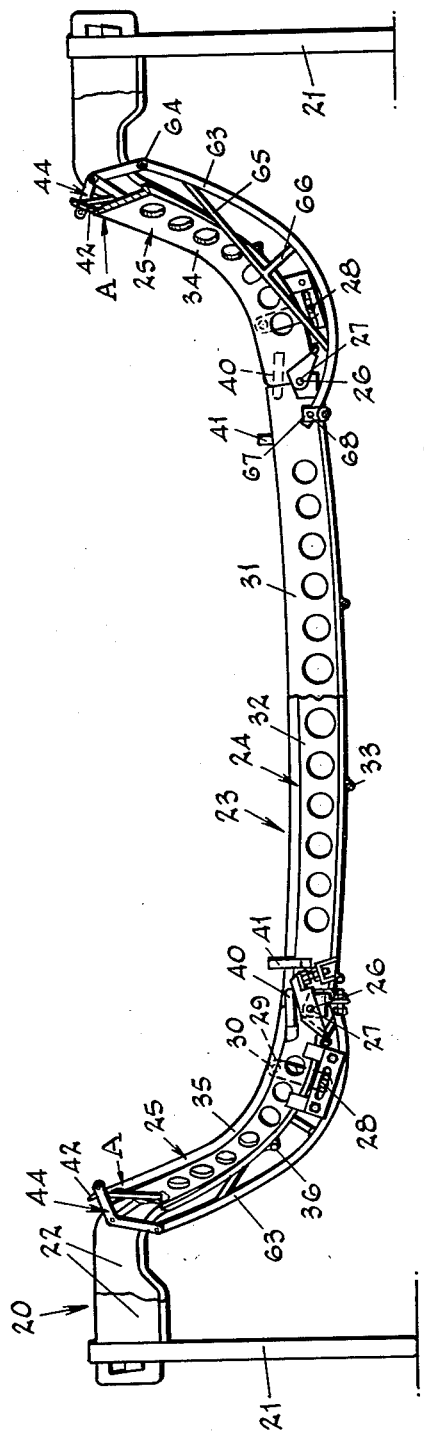
FIG. 2 is a side elevation of the bending mold of FIG. 1 partially in section taken substantially along the section line 2—2 and showing the locating means associated therewith when the mold is in the closed position.

When the mold is moved to its spread apart or open position as shown in FIG. 1 to receive a glass sheet 39, fingers 40, which are mounted on the end sections adjacent the hinges 26 move upwardly into engagement with the underside of the glass sheet 39. Thus, the fingers 40 serve to support the glass sheet when the mold is in the sheet receiving position by engaging marginal surface portions of the sheet.

In order to properly locate the flat glass sheet relative to the shaping surface of the mold and to prevent lateral movement of the glass sheet, upwardly extending pins 41 are secured to the mold center section 24 adjacent the fingers 40. These pins are located in substantial juxtaposition with the glass sheet 39 and are outwardly spaced from the edge of the glass sheet a distance great enough to permit easy removal of the bent glass sheet from the mold in the closed position of FIG. 2. It will be noted that the edges of the glass sheet will move in a direction parallel to the vertically extending pins 41 when the sheet is removed from the mold and thus no interference is encountered.

Figure 6:
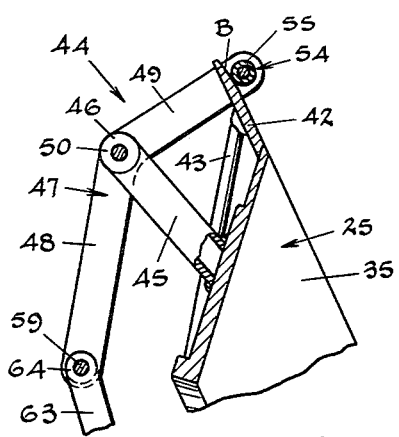
FIG. 6 is an enlarged fragmentary sectional elevation taken substantially along the section line 6—6 of FIG. 5.
Figure 5:
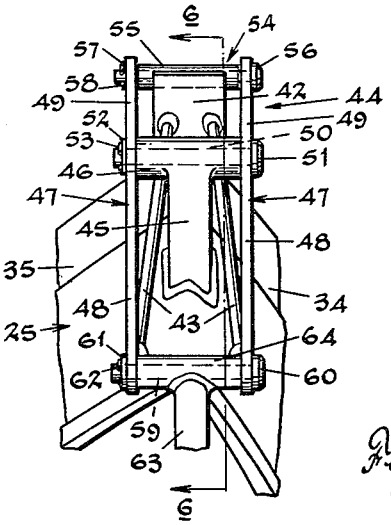
FIG. 5 is an enlarged fragmentary end view of the mold showing the improved glass locating means of the invention.

According to the present invention a substantially flat rectangular shaped sheet supporting plate or fairing 42 extends outwardly from each end section 25 as shown in FIGS. 5 and 6. More particularly, the support plate 42 is rigidly secured to the extreme outermost portion of each end section 25 at the apex of the V formed by the intersection of forming rails 34 and 35. It is apparent from FIGS. 7, 8 and 9 that a marginal edge portion of the outermost end of the flat glass sheet 39 which is to be bent contacts the upwardly facing surface of each support plate 42 in sliding engagement during the bending cycle. As seen in FIG. 6 the upwardly facing surface of the support plate 42 is preferably tangent to the curve of the shaping surface of the end section forming rails 34 and 35 and therefore the support plate 42 is substantially parallel to and in the same plane as the adjacent portions of the shaping surfaces of forming rails 34 and 35. This permits the glass sheet 39 to sag into contact with the mold shaping surfaces without marking the sheet along the area adjacent the intersection of the support plate 42 and the end section 25.

To rigidly maintain the upwardly facing surface of the support plate 42 substantially parallel to the shaping surfaces of the end section forming rails 34 and 35, a pair of substantially cylindrical diagonal brace members 43 are rigidly secured to a central portion of the underside of each support plate 42. The opposite end of each brace member 43 is attached to a lower portion of each of the forming rails 34 and 35 as most clearly seen in FIG. 6.

To properly locate and position the flat glass sheet upon the bending mold 23 and to prevent movement of the sheet in the longitudinal direction during movement of the mold through the bending furnace, a movable sheet locating device 44 is carried by each end section 25. The locating device 44 is mounted upon the extreme outermost portion of each end section 25 by means of a longitudinally extending tubular mounting member 45 secured to the end section forming rails 34 and 35 beneath the support plate 42. It is desirable to use tubular members because the reduced mass of such members retain less heat from the bending furnace. As most clearly shown in FIGS. 5 and 6, the innermost end of mounting member 45 is rigidly secured to the end section 25 at the intersection of forming rails 34 and 35 and extends outwardly in a direction which is substantially parallel to the longitudinal axis L—L of the mold 23. At the outermost end of the mounting member 45 and extending parallel to the transverse axis T—T of the mold is a substantially hollow bearing block 46 which is used to pivotally mount the locating device 44 for arcuate movement about an axis which is substantially parallel to the transverse axis T—T of the mold.

A pair of substantially vertical elongated movably mounted members or levers 47 are pivotably carried by the mounting member 45 at either end of the transversely extending cylindrical bearing block 46. As most clearly seen in FIG. 6, each L-shaped movably mounted lever 47 comprises a generally downwardly extending leg portion 48 and a generally upwardly extending leg portion 49 with an aperture located substantially at the intersection of the two leg portions. This aperture is adapted to receive the cylindrically shaped pivot pin 50 which extends through both the movably mounted levers 47 and the bearing block 46 and which serves as a journal about which the levers 47 rotate.

To maintain the pin 50 in its proper position a substantially enlarged head 51 is formed at one end thereof which is greater in diameter than the aperture in the lever 47; thus movement of the pin through the aperture is limited by the engagement of the head 51 with the lever 47. To limit the movement of the pin 50 in the direction toward the head 51, a retaining washer 52 is placed upon the pin 50 at the opposite end from the head 51, and inasmuch as the outside diameter of the washer 52 is greater than that of the aperture in the center of the members 49, the washer 52 engages the member 49 adjacent the aperture. To restrain the pivot pin 50 from endwise movement within the bearing block 46 a cotter key 53 is secured thereto at the opposite end from the head 51 and outwardly from the retaining washer 52. As shown in FIGS. 1 and 5 the pivot pin 50 and the bearing block 46 not only pivotally carry the pair of movably mounted members or levers 47 but also positively maintain them in spaced relationship in planes that are substantially parallel to the longitudinal axis L—L of the mold 23.

In order to prevent longitudinal movement of the glass sheet 39 the leg portion 49 of each member or lever 47 is angularly disposed to the support plate 42 and extends upwardly from the pivot pin 50 to a point substantially above the upwardly facing surface of the support plate 42 and thus a portion of each member or lever 47 protrudes above the shaping surface of the end mold section 25. Another aperture is located in each leg portion 49 within that portion which extends above the upwardly facing surface of the support plate 42 and is adapted to receive an elongated cylindrical sheet locating member or bar 54 which extends transversely across the support plate 42 through both vertically extending members or levers 47 along an axis which is substantially parallel to the common axis of pin 50 and bearing block 46. The cylindrical surface of the member 54 prevents marking or chipping of the edges of the glass sheet 39.

The locator member 54 comprises a tubular bar 55 which is generally the same length as the bearing block 46 and is carried between the outer ends of the leg portions 49 by means of a headed pin 56 inserted through the aforementioned apertures provided in said leg portions. The pin 56 is secured from endwise movement by a washer 57 and cotter pin 58, as shown in FIG. 5, which also serves to prevent divergent movement of the vertically extending levers 47 relative to one another. Since the pin 56 is substantially parallel to the pivot pin 50, the levers will rotate equally about said pin 50 and the locator member 54 will be retained in parallelism with the transverse axis T—T of the mold 23.

A linking pin 59 extends through apertures which are located in the outermost end portions of the downwardly extending leg portions 48 of the movably mounted lever members 47. The pin 59 has an enlarged head 60 formed on one end thereof while a retaining washer 61 is mounted upon the opposite end and is maintained in position by means of a cotter key 62. The pin 59 serves not only to maintain the leg portions 48 of the lever members 47 in alignment but also to carry an elongated link or actuating member 63, which will be described in greater detail later, therebetween.

It is apparent that a force applied to the pin 59 in a direction which is angularly disposed to the plane of downwardly extending leg portions 48 will cause the locating device 44 to rotate about the pin 50 in an arcuate movement which in turn will move the transversely extending sheet locating member 54 toward or away from the transverse center line T—T of the mold 23. To transmit such an actuating force to rotate the sheet locating member 54 out of juxtaposition with the sheet edge thereby permitting removal of the glass sheet 39 from the mold 23, the link 63 which is a generally J-shaped rod is carried by the pin 59 by means of a hollow cylindrical pin receiving portion or bearing block 64 which is rigidly secured to the upper end of the rod 63 extending at right angles thereto, as in FIG. 5. In order to concentrate the rotating force applied to the pin 59 by the single actuating member 63 and thus ensure that equal forces are transmitted to both lever members 47, the member 63 is secured to the bearing block 64 substantially at the center thereof. A single actuating member or link 63 is used at each end of the mold to reduce the mass of metal which must be heated by the furnace.

Referring now to FIG. 2, it is seen that the elongated J-shaped actuating link 63 is so formed in order that it properly clears the structure of the end sections 25 and adequately separates the heated mass of the member 63 from the underside of the glass sheet 39 as the mold passes through the bending furnace. It is also evident from FIGS. 3 and 4, that the link 63 extends downwardly from the extreme outer ends of the end sections 25 in a plane which is parallel to the longitudinal axis L—L of the mold 23 and somewhat offset therefrom in order to transmit a rotating force to the locating device 44 which is normal to the transverse axis T—T.

To rigidly maintain the modified J-shaped contour of the link 63, a diagonally extending truss member 65 connects angularly disposed sections of the link 63 as shown most clearly in FIG. 2. To supply further rigidity to the truss member 65 and the link 63, a king truss member 66 is secured between the link 63 and the diagonal truss member 65 at substantially the center thereof and at right angles thereto.

The opposite extremity of the elongated actuating link 63 is pivotally attached to the mold center section 24 by means of a clevis 67 which is mounted upon the outermost center section tie rod 33 as most clearly seen in FIGS. 2 and 4. A clevis pin 68 passes through both the clevis 67 and a suitable aperture in the endmost portion of member 63 to permit arcuate movement of the member 63 in a substantially vertical plane.

Figure 10:
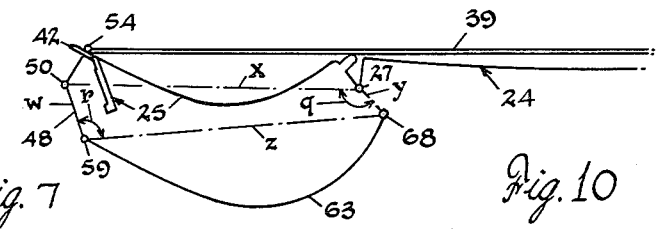
FIG. 10 is a line schematic view showing the mold in the fully open position of FIG. 7.
Figure 11:
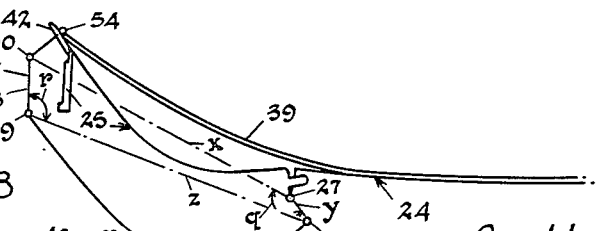
FIG. 11 is a line schematic view showing the mold in the partially closed position of FIG. 8.
Figure 12:
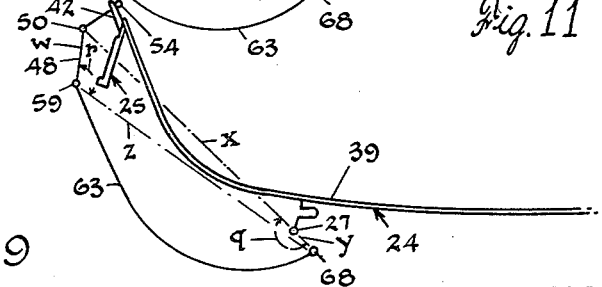
FIG. 12 is a line schematic view showing the mold in the fully closed position of FIG. 9.

In examining the elements that are utilized to impart the rotative force to the elongated sheet locating member 54 it is shown by the dotted lines in FIGS. 10, 11 and 12 that a four-bar linkage results if, for the sake of analysis, the following equivalents are established: the downwardly extending leg portion 48 of the movably mounted member 47 or the chord distance between the axis of pivot pin 50 and the axis of linking pin 59 is considered to be a first radial link $w$; the mounting member 45 and the end section 25 or the chord distance between the axis of pivot pin 50 and the axes of hinge pins 27 is considered to be a second radial link $x$; the center section 24, the tie rod 33, and the clevis 67 or the chord distance between the axes of hinge pins 27 and the axis of clevis pin 68 is considered to be a third radial link $y$; and the link 63 or the chord distance between the axis of clevis pin 68 and the axis of linking pin 59 is considered to be a fourth radial link $z$. From the kinematics of this resulting four-bar linkage shown in FIGS. 10, 11 and 12, it is evident that as the interior angle $q$ of the four-bar linkage increases when the mold moves from the open position of FIG. 10 to the closed position of FIG. 12 the interior angle $r$ also increases. Inasmuch as the link $y$ is a part of the mold center section 24, the relative position of the hinge pin 27 and the clevis pin 68 are constant; therefore, the link $x$ must rotate about the hinge pin 27 and the link $z$ must rotate about the clevis pin 68. It is evident that when the angle $r$ increases as the link $x$ rotates about hinge pin 27 and link $z$ rotates about clevis pin 68, the pin 59 moves inwardly toward the end mold section 25 thereby rotating the sheet locating member 54 outwardly away from the edge of the glass sheet 39.

Figure 13:
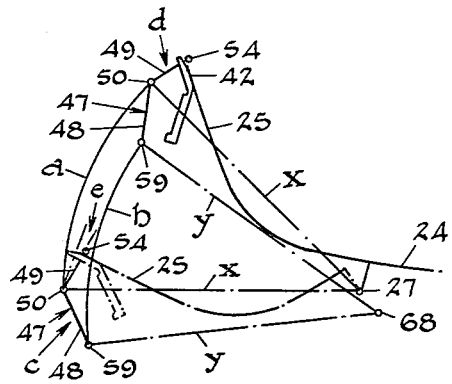
FIG. 13 is a schematic view showing the pivotal motions of the locating means between the positions of FIGS. 10 and 12.

In other words, as shown diagrammatically in FIG. 13, when the end mold sections 25 move from the open position of FIG. 10 to the closed position of FIG. 12 relative to the center mold section 24, the link $x$, discussed above, will be swung radially about the axis of the related hinge pin 27 to move the axis of the pivot pin 50 through an arc designated by the letter $a$. Similarly, the link $z$ will be swung radially about the axis of the related clevis pin 68 to move the axis of the pin 59 through an arc $b$. However, since the axis of the clevis pin 68 is located inwardly of, or toward the transverse axis T—T of the mold, and beneath the axis of the hinge pin 27, the arcs $a$ and $b$ described by the pivot pin 50 at the free end of link $x$ and the pivot pin 59 at the free end of link $z$ will be non-parallel or eccentric to one another. Due to this arrangement, the distance between the described arcs will decrease as the end mold sections move from the closed to the open position. Accordingly, the leg portion 48 of the lever 47 at the lower end thereof will be swung inwardly about the axis of the pivot pin 50 as the associated end mold section 25 moves toward its closed position. This will be reflected in outward movement of the sheet locator member 54, at the upper end of leg portion 49, with reference to the support plate 42. Conversely, as the end mold section is moved to the open position, the leg portion 48 of lever 47 will be swung radially outwardly with a resultant inward movement of the leg portion 49 and the locator member 54 a distance indicated by the angle $e$. This will position the locator 54, at each end of the bending mold, to properly engage and locate a flat glass sheet on the surfaces of the support plates 42.

In operation, as the mold is moved to an open position, the center section 24 moves upward and the outermost end portions of the end sections 25 move downward. As the pivot pin 50 is carried downward in an arcuate path described by the arc $a$ relative to the hinge pin 27 the angle $q$ decreases, and this in turn causes a proportionate decrease in the angle $r$. Thus the downwardly extending leg portions 48 of the movably mounted members 47 are caused to swing outward in an arcuate path about the pivot pin 50, while the upwardly extending leg portion 49 is rotated inwardly toward the transverse center line T—T of the mold. This moves the sheet locating member 54 inwardly toward the transverse center line T—T of the mold in order that flat glass sheet 39 may be properly positioned upon the mold in the sheet receiving position as shown in FIG. 1.

Movement of the glass sheet 39 is prevented by the engagement of the sheet locating member 54 with an edge portion of said sheet adjacent the marginal edge portion that is supported by the support plate 42. It is not necessary for the locating member 54 to simultaneously contact both ends of the sheet 39, but it has been found quite satisfactory if the edge of the sheet 39 and the locating member 54 are located in substantial juxtaposition to provide approximately ⅛ inch clearance therebetween.

Figure 7:
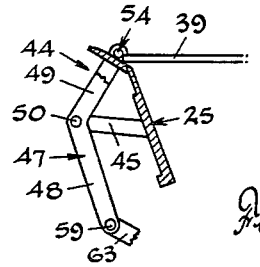
FIG. 7 is a diagrammatic sectional view showing the mold in the fully open sheet receiving position with a flat glass sheet supported and located thereon.

Referring now to FIGS. 7 to 12, the respective positions of the various elements of the bending apparatus are shown as the glass sheet is bent. FIGS. 7 and 10 show the flat glass positioned upon the mold 23 when it is in the fully open position. The extreme outermost edge portion of the glass sheet 39 is supported upon the upwardly facing surface of the support plate 42 and this edge portion is maintained in its proper position on the plate 42 by the locating member 54. Referring to FIG. 1 it is seen that the chordal distance between outermost ends A of the mold end sections in the open position is greater than the chordal distance between these ends when the mold is in the closed position of FIG. 2.

Figure 8:
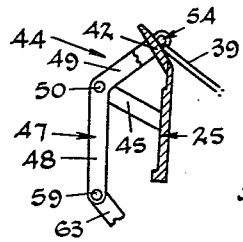
FIG. 8 is a diagrammatic sectional view showing the mold partially closed and the glass sheet sagging toward the mold shaping surface.

FIGS. 8 and 11 show the mold and the glass sheet part way through the bending cycle wherein the sheet 39 has sagged into contact with the shaping surface of the center section 24 but has not yet contacted the shaping surface of the end section forming rails. The sheet is still supported by the support plate 42 and the endmost edges thereof are in substantial juxtaposition with the locating members 54 because of the decrease in the chordal distance of the mold even though the members 54 have rotated outwardly inasmuch as the angle $r$ has been increased by the downward movement of the center section 24 and the upward movement of the end section 25 which causes the movably mounted members 47 to rotate about the pin 50.

Figure 9:
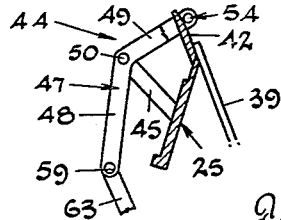
FIG. 9 is a diagrammatic sectional view showing the mold in the fully closed position with the bent glass sheet contacting the mold shaping surface.

FIGS. 9 and 12 show the mold in the closed position with the glass fully bent. As seen in FIG. 12, the glass sheet now contacts both the shaping surfaces of the center section 24 and the end sections 25. Thus, the underside of the sheet 39 is parallel to both the shaping surfaces of the end sections 25 and the upper surface of the support plate 42, and the weight of the sheet 39 is supported by the forming rails of the center section 24 and the end sections 25. Also, the elongated actuating member 63 has rotated the members 47 about their axes which in turn has moved the locating members 54 to their outermost position which is out of juxtaposition with the extreme outermost edges of the glass sheet 39. Even though the chordal distance between the outermost portion A of the mold end sections has decreased the glass sheet 39 will not engage the locating members 54 because the glass sheet 39 now covers the peripheral distance of the mold shaping surface instead of the chordal distance.

It is apparent from FIGS. 7, 8 and 9 that the locating member 54 rotates in an arc about the pin 50 and that the greater the distance between the pivot pin 50 and the locating member 54 the greater the arc of movement. Consequently, the arcuate movement of the member 54 will approach a longitudinal movement parallel to the upwardly facing surface of the support plate 42 as the length of the leg 49 is increased. However, the size of the locating device 44 is limited to one in which the mass of the various component members will not absorb an excessive amount of heat from the bending furnace and thereby cause uneven cooling of the bent glass sheet. Likewise, the mold may pass through a series of contoured nozzles in a tempering area after it leaves the furnace; thus the locating device 44 must not be of a size or configuration that movement through the tempering area is restricted.

It is therefore apparent that the movement of the locating member 54 is in an arcuate path which starts adjacent the support plate and swings upwardly away from the surface of the plate but returns to the surface at the end of the arc. It is desirable to bevel the outermost portions B of the upwardly facing surface of the support plate 42 to provide clearance between the member 54 and the support plate 42. This arcuate movement has been found desirable because as shown in FIGS. 7, 8 and 9 the angle between the glass sheet 39 and the upwardly facing surface of the support plate 42 decreases whereby the edge of the sheet 39 is more likely to move out of contact with the plate 42 and slide over the locating member 54. However, the arcuate movement of the member 54 increases the distance between support plate 42 and the locating member 54 sufficiently to ensure proper engagement between the outermost edge of the sheet 39 and the bar 54.

Figure 14:
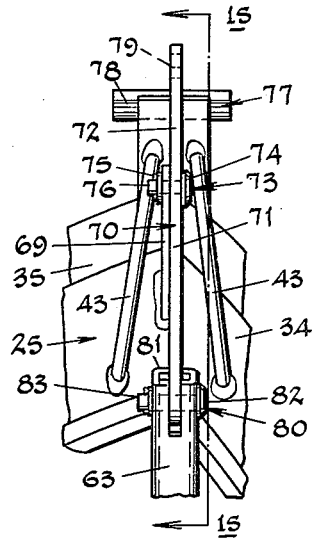
FIG. 14 is an enlarged fragmentary end view of the mold showing a modified locating means used in conjunction with the mold.
Figure 15:
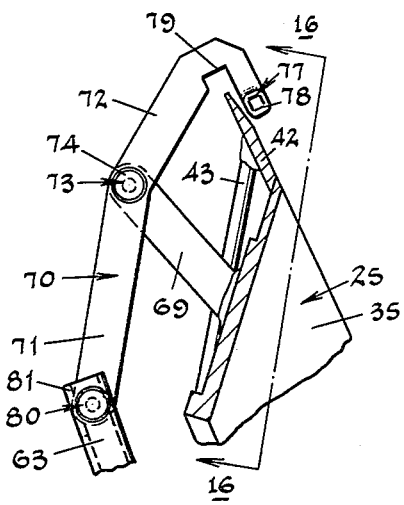
FIG. 15 is an enlarged fragmentary sectional view taken substantially along the section line 15—15 of FIG. 14.
Figure 16:
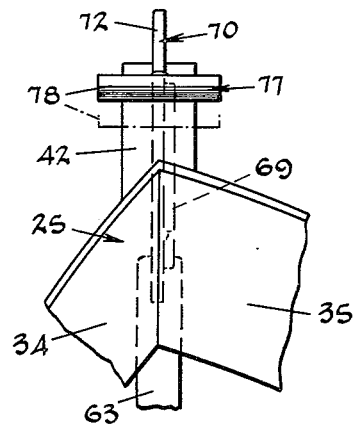
FIG. 16 is an enlarged fragmentary sectional view taken substantially along the section line 16—16 of FIG. 15.

FIGS. 14, 15 and 16 show a modification of the improved locating device constructed in accordance with this invention and like numerals are used to indicate like elements throughout the same. It will be noted that the mounting member 69 does not carry a transversely extending bearing block as does the mounting member 45 of FIG. 5, but instead member 69 has an aperture formed in the outermost end thereof which carries a single movably mounted member 70 comprising a downwardly extending leg portion 71 and an upwardly extending leg portion 72. By using a single vertical member 70, the support plate 42 may be of any width and this embodiment is particularly useful on molds adapted to bend block size glass sheets. An aperture is formed in the substantially L-shaped member 70 at the intersection of the downwardly extending leg portion 71 and the upwardly extending leg portion 72, and a pin 73 passes through the aligned apertures of the mounting member 69 and the movably mounted member 70 to provide a pivotal mounting for the member 70.

The pin 73 has an enlarged head 74 formed at one end thereof which prevents transverse movement of the pin through the aligned apertures while transverse movement through the apertures in the opposite direction is prevented by means of a washer 75 secured in position by cotter key 76.

As seen in FIG. 15, the uppermost end of the upwardly extending leg portion 72 of the member 70 has a sheet locating portion 77 extending therefrom incorporating a rigidly secured transversely extending sheet locating member 78 having rounded edges which are substantially perpendicular to the member 70. The locating member 78 may be of any length and is not limited by the width of the support plate 42. In order that the member 70 may move the member 78 to a sheet locating position in substantial juxtaposition with the edge of the glass sheet 39 when the mold is moved to its open position, the vertically extending member 70 has a notched-out portion 79 which provides clearance between the member 70 and the support plate 42.

An aperture located in the lowermost portion of the downwardly extending leg portion 71 is adapted to receive the pin 80 which also passes through the aligned apertures of the clevis 81 formed in the uppermost end of the elongated member 63. The pin 80 has an enlarged head 82 formed at one end thereof which prevents transverse movement of the pin through the apertures and such movement in the opposite direction is prevented by means of cotter key 83.

FIG. 16 shows a relative position of the component parts of this embodiment when the mold is in either the open or the closed position. The solid portion of this figure denotes the position of the sheet locating member 78 when the mold is in the closed position and the glass sheet 39 is permitted unrestrained movement along the sheet supporting plate 42. When the mold is moved to the open position the actuating member 63 pivots the member 70 about the pin 73 thereby moving the sheet locating member 78 to the sheet locating position as shown by the dotted lines.

It is to be understood that the forms of the invention disclosed herein are to be taken as the preferred embodiments thereof, and that various changes in the shape, size and arrangement of parts may be resorted to without departing from the spirit of the invention.

I claim:

1. In apparatus for bending glass sheets, a mold comprising an intermediate section and a movable end section rotatably joined for movement between opened and closed positions, a substantially flat sheet supporting plate fixed to said end section and extending outwardly therefrom, an upwardly facing support surface formed on said plate and being located in the plane of the upper surface of the adjacent portion of said end section, a substantially elongated locating member extending parallel to and transversely across said support surface, a movably mounted member secured to said locating member and pivotally mounted on said end section beneath said support plate to rock about an axis substantially parallel to said support surface, and an actuating member connected to said movably mounted member and to said intermediate section and operable to rock said movably mounted member about said axis thereby to move said locating member back and forth along said plate as said end section moves between said open and said closed positions.

2. In apparatus for bending glass sheets, a bending mold comprising an intermediate section and an end section disposed end to end along a longitudinal axis and pivotally joined together at adjacent ends to move between open and closed positions, upwardly directed shaping surfaces formed on said intermediate section and said end section, a supporting plate fixed to said end section adjacent a portion of said shaping surface formed thereon and extending longitudinally outwardly of said mold, a substantially flat upwardly directed sheet supporting surface formed on said plate in the plane of said adjacent portion of said shaping surface, a sheet locating member extending transversely across said plate above said supporting surface, a mounting member fixed to said end section beneath said plate and projecting outwardly from said mold along an axis substantially parallel to said supporting surface, an elongated member disposed laterally of said mounting member and transversely to the plane of said supporting surface and having one end attached to said locating member, means journaling said elongated member intermediate its ends on said mounting member to rock about an axis substantially parallel to said supporting surface, and an actuating member having one end pivoted to the other end of said elongated member and the opposite end pivoted to said intermediate section, said actuating member being operable to rock said elongated member about said axis in response to movement of said mold sections between said open and closed positions thereby to shift said locating member along said plate toward and away from said shaping surfaces.

3. In apparatus for bending glass sheets, the combination of, a rack, a bending mold comprising a center section and oppositely disposed end sections arranged end to end along a longitudinal axis with the adjacent ends pivotally joined together, means supporting said end sections on said rack to move about fixed axes between an open position and a closed position, said center sections and said end sections having a substantially continuous upwardly directed shaping surface formed thereon and conforming in elevation and outline to the glass sheet when bent when said mold sections are in said closed position, a sheet supporting plate secured to each of said end sections adjacent said shaping surfaces and extending longitudinally outwardly therefrom to engage a marginal surface portion of said sheet when said mold sections are in said opened position, a sheet locating member disposed transversely of each of said plates, a substantially vertically disposed lever pivotally mounted intermediate its ends to each of said end sections and attached at their upper end to said sheet locating member, and actuating members each having one end pivotally joined to the lower end of one of said levers and the opposite end pivotally joined to said center section for movement relative thereto about an axis located beneath one of said fixed axes whereby upon movement of said mold sections about said fixed axes to an open position said levers are swung by said actuating members in a direction to move said sheet locating members inwardly toward said shaping surfaces and upon movement of said mold sections into said closed position are swung in an opposite direction to move said locating members outwardly away from said shaping surfaces.

References Cited in the file of this patent

UNITED STATES PATENTS

| | | |
|---|---|---|
| 2,737,758 | Jendrisak | Mar. 13, 1956 |
| 2,744,359 | Jendrisak | May 8, 1956 |
| 2,758,422 | Jendrisak | Aug. 14, 1956 |
| 2,774,189 | Jendrisak | Dec. 18, 1956 |
| 2,872,756 | Jendrisak | Feb. 10, 1959 |
| 2,901,866 | McKelvey et al. | Sept. 1, 1959 |